(12) United States Patent
Takahashi et al.

(10) Patent No.: US 8,968,813 B2
(45) Date of Patent: *Mar. 3, 2015

(54) INSTANT NOODLES AND METHOD FOR PRODUCING THE SAME

(75) Inventors: Rintaro Takahashi, Osaka (JP); Yuji Ishii, Osaka (JP); Kunihiko Yoshida, Osaka (JP); Takeshi Asahina, Osaka (JP); Shunsuke Sakai, Osaka (JP); Yoshifumi Miyazaki, Osaka (JP); Mitsuru Tanaka, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/574,051

(22) PCT Filed: Mar. 14, 2011

(86) PCT No.: PCT/JP2011/001471
§ 371 (c)(1),
(2), (4) Date: Jul. 19, 2012

(87) PCT Pub. No.: WO2011/114690
PCT Pub. Date: Sep. 22, 2011

(65) Prior Publication Data
US 2012/0288607 A1 Nov. 15, 2012

(30) Foreign Application Priority Data

Mar. 19, 2010 (JP) ................................ 2010-065247

(51) Int. Cl.
*A23L 1/162* (2006.01)

(52) U.S. Cl.
CPC ..................................... *A23L 1/162* (2013.01)
USPC .......................................... 426/557; 426/451

(58) Field of Classification Search
USPC ................................. 426/557, 451
See application file for complete search history.

(56) References Cited

U.S. PATENT DOCUMENTS

| | | | | |
|---|---|---|---|---|
| 4,244,974 A | * | 1/1981 | Minami et al. | 426/94 |
| 4,271,205 A | * | 6/1981 | Kaneko | 426/451 |
| 4,483,879 A | | 11/1984 | Sugisawa et al. | |
| 4,830,866 A | | 5/1989 | Manser et al. | |
| 5,534,273 A | * | 7/1996 | Ito et al. | 426/18 |
| 5,599,573 A | | 2/1997 | Barnes et al. | |
| 5,972,407 A | * | 10/1999 | Hsu | 426/557 |
| 8,236,363 B2 | * | 8/2012 | Miyazaki et al. | 426/451 |

FOREIGN PATENT DOCUMENTS

| | | |
|---|---|---|
| CN | 1140558 A | 1/1997 |
| CN | 1236564 A | 12/1999 |
| CN | 1605271 A | 4/2005 |
| EP | 0630581 | 12/1994 |
| JP | 54-135247 | 10/1979 |
| JP | 56-037776 | 9/1981 |
| JP | 58-216656 | 12/1983 |
| JP | S60217868 | 10/1985 |
| JP | 62-032907 | 7/1987 |
| JP | 62-228240 | 10/1987 |
| JP | 5-44257 | 7/1993 |
| JP | 7-250640 | 10/1995 |
| JP | 9-103261 | 4/1997 |
| JP | 11-151071 | 6/1999 |
| JP | 2001-346532 | 12/2001 |
| JP | 2003-038114 | 2/2003 |
| JP | 3535145 | 3/2004 |
| JP | 2005-269979 | 10/2005 |
| JP | 2006-166766 | 6/2006 |
| JP | 2007-060904 | 3/2007 |
| JP | 2007-274930 | 10/2007 |
| JP | 2008-029273 | 2/2008 |
| JP | 2010-130980 | 6/2010 |
| JP | 4611439 | 1/2011 |
| RU | 2145783 | 2/2000 |
| RU | 2152735 | 7/2000 |
| SU | 658373 | 4/1979 |
| SU | 1582971 | 7/1990 |
| WO | 2010/055860 | 5/2010 |
| WO | 2011/013185 | 2/2011 |

OTHER PUBLICATIONS

Japan Food Journal, Nissin Food Products Co., Ltd., "Shin Rao Hatsubai e", Aug. 27, 2010; and partial English translation thereof.
Notice of Grant from Russian Patent Office, dated Feb. 20, 2013 along with an english translation thereof.
Chinese Office Action in counterpart application No. 201180006811.7, dated May 21, 2013 (with partial English-language translation).
European Office Action in counterpart application No. 11755881.7, dated Jul. 8, 2013.

* cited by examiner

*Primary Examiner* — Lien T Tran
(74) *Attorney, Agent, or Firm* — Greenblum & Bernstein, P.L.C.

(57) ABSTRACT

Instant noodles are produced, which have an excellent reconstitution property, can be reconstituted by pouring of boiling water even if the noodles are thicker than before, and have excellent taste and texture. The instant noodles are produced by: making raw noodle strings each having a multilayer structure including three or more layers; spraying superheated steam to the raw noodle strings; gelatinizing the noodle strings to which the superheated steam has been sprayed; and drying the noodle strings which have been gelatinized. It is preferable to gelatinize the noodle strings by spraying the superheated steam to the noodle strings, supplying moisture in liquid form to the noodle strings, and further heating the noodle strings by using the superheated steam and/or saturated steam.

9 Claims, 2 Drawing Sheets

INSTANT NOODLES AND METHOD FOR PRODUCING THE SAME

TECHNICAL FIELD

The present invention relates to a method for producing instant noodles having an excellent reconstitution property and the instant noodles produced by this method.

BACKGROUND ART

Instant noodles are produced by gelatinizing cut raw noodle strings and then drying the noodle strings by frying, hot-air drying, freeze dry, or the like. The instant noodles can be reconstituted (reconstituted in boiling water) and easily eaten only by pouring boiling water and leaving the noodles for about three to five minutes or by boiling and cooking the noodles for about one to three minutes. Thus, the instant noodles are extremely convenient instant foods.

However, thick noodle strings are not easily reconstituted. The thick noodle strings are not reconstituted only by pouring the boiling water and leaving the noodle strings for about three to five minutes, and cores of the noodle strings remain uncooked in some cases. Therefore, it is necessary to reduce the thickness of the noodle.

On this account, even in the case of thick noodle products, the thickness of the noodle after the reconstitution is about 1.4 mm at most, and the shape thereof is a flat noodle shape. Thus, he/she cannot fully enjoy the smooth feeling of noodles passing through his/her throat. Here, there is a need for a technology of being able to reconstitute thicker noodles in boiling water.

In addition, if the reconstitution property of thin noodles is improved, the wait time before eating can be further shortened. A technology of improving the reconstitution is extremely useful for the instant noodles.

Instant noodles producing methods relevant to the present invention are disclosed in PTLs 1 to 3.

CITATION LIST

Patent Literature

PTL 1: Japanese Examined Patent Application Publication No. 62-32907
PTL 2: Japanese Examined Patent Application Publication No. 56-37776
PTL 3: Japanese Patent No. 3535145

SUMMARY OF INVENTION

Technical Problem

To solve the above problems, the present inventors have found that the reconstitution property of the instant noodles is significantly improved by spraying superheated steam to raw noodle strings, heating the noodle strings by using the superheated steam while intermittently supplying moisture, and drying the noodle strings, and the instant noodles can be reconstituted even if the noodles are considerably thick. The present inventors have filed this finding as Japanese Patent Application No. 2009-179968. Here, to further improve this proprietary technology, the present inventors have conducted an experiment in which in the above technology, the noodle strings are made to have a three-layer structure, and various additives are added to an inner layer or outer layer of the three-layer structure.

Here, an unpredictable result was obtained in the process of this experiment. To be specific, even if there is no difference in the combination of noodle raw materials, the combination ratio, and the additives between the inner layer and the outer layer, the reconstitution property of the noodles each having the three-layer structure becomes significantly better than that of the noodles each having a single-layer structure or a double-layer structure by spraying the above-described superheated steam to the noodles each having the three-layer structure. FIG. 1 is a photograph showing a cross section of an instant fried noodle actually produced by the method of the present invention. It is clear from this photograph that the inner portion of the noodle has swelled more than that produced by a conventional method of FIG. 4.

PTL 1 describes that the reconstitution property of the instant noodles improves by producing the noodle strings each having the three-layer structure and adding starch to the inner layer in an instant noodles producing step. However, the present invention has an effect of the improvement of the reconstitution property even if the inner layer and the outer layer are the same in the combination of raw materials as each other, and the level of the effect of the present invention is much higher than the level of the effect of PTL 1. In PTL 1, if the starch content in the inner layer is increased, the noodles tend to lose their texture in boiling water, and the noodle making property is also adversely affected. However, the present invention does not have such defects and can obtain the effect of the improvement of the reconstitution property.

PTLs 2 and 3 each discloses a technology in which the raw noodle strings are subjected to the superheated steam in the instant noodles producing step for purposes other than drying. However, in PTL 2, normal noodle strings not having a multilayer structure are just subjected to low-temperature superheated steam, and the reconstitution property is not so improved by this technology. In PTL 3, while the noodle strings are steamed by saturated steam, the ambient atmosphere of the noodles is heated to produce the superheated steam. Unlike the present invention, high-temperature superheated steam is not sprayed to the noodle strings. Therefore, the effect of the improvement is inadequate.

In view of the above circumstances, an object of the present invention is to obtain instant noodles, which have an excellent reconstitution property and can be reconstituted by pouring boiling water and have excellent taste and texture even if the noodles are thicker than before, that is, to provide instant noodles and a method for producing the instant noodles, each of which can realize reconstitution without adversely affecting the noodle quality and the noodle making property even if the noodles are extremely thick and can make him or her enjoy a "deep and smooth feeling of noodles passing through his/her throat" which cannot be felt by eating conventional instant noodles.

Solution to Problem

To solve the above problems, the present inventors have succeeded in producing the instant noodles having extremely high reconstitution property and excellent taste and texture by: in an instant noodles producing process, making the noodle strings each having the multilayer structure, which is equal to or more than the three-layer structure, in a noodle making step; spraying the superheated steam to the raw noodles each having the multilayer structure; and gelatinizing the noodle strings. Thus, the present invention was made.

The gelatinizing step herein is a step of gelatinizing the noodle strings by using steam or by boiling to a level that the noodle strings can be eaten. A preferable gelatinizing method of the present invention is a method for supplying moisture in liquid form to the noodles to which the superheated steam has been sprayed and then heating the noodles by the superheated steam or the saturated steam.

The noodle making step of the present invention includes the steps of: adding kneading water to raw material powder, such as wheat flour; kneading the mixture to produce a noodle dough; shaping the noodle dough to form a noodle belt; thinly rolling out the noodle belt; and cutting the noodle belt by a cutting blade roll to obtain the noodle strings. In the present invention, the "superheated steam" denotes "saturated steam heated (or raised in temperature) to 100° C. or higher under atmospheric pressure", and "spraying the superheated steam" denotes "emitting the superheated steam through an emission hole in a steam chamber to cause the superheated steam to contact the noodle strings".

A specific example of the producing method of the present invention is a below-described instant noodles producing method including steps (a) to (e). To be specific, the present invention is an instant noodles producing method including the steps of: (a) adding kneading water to noodle raw material powder, such as wheat flour, kneading this mixture to prepare a noodle dough, and rolling out the noodle dough to form a noodle belt; (b) stacking and rolling out three or more noodle belts, each formed by the step (a), to combine these noodle belts into one noodle belt having a multilayer structure; (c) further rolling out the combined noodle belt of the multilayer structure and cutting the combined noodle belt to obtain raw noodle strings; (d-1) spraying superheated steam to the raw noodle strings; (d-2) gelatinizing the noodle strings to which the superheated steam has been sprayed; and (e) drying the noodle strings which have been gelatinized.

Here, the step (a) may include the steps of: (a-1) adding kneading water to noodle raw material powder, such as wheat flour, kneading this mixture to prepare a noodle dough, and rolling out the noodle dough to form an inner-layer noodle belt; and (a-2) adding kneading water to noodle raw material powder, such as wheat flour, kneading this mixture to prepare a noodle dough, and rolling out the noodle dough to form each of two outer-layer noodle belts. In this case, the step (b) is a step of sandwiching the inner-layer noodle belt formed in the step (a-1) between two outer-layer noodle belts formed in the step (a-2) and rolling out these noodle belts to combine the noodle belts into one noodle belt having a multilayer structure.

Then, as the gelatinizing treatment in the step (d-2), a method for supplying the moisture in liquid form to the noodle strings and then heating the noodle strings, specifically, a method for supplying the moisture in liquid form to the noodle strings and then heating the noodle strings by using the superheated steam or the saturated steam may be used, or a gelatinizing treatment using boiling may be used. Moreover, the combination of these methods may be used. A preferable method is a method for gelatinizing the noodle strings by: spraying the superheated steam to the raw noodle strings in the step (d-1); supplying the moisture in liquid form to the noodle strings to increase the water content of the noodle strings; and heating the noodles, whose water content has been increased, by using the superheated steam and/or the saturated steam. Moreover, by repeating this treatment, water and heat are supplied to the inner portions of the noodles even if the noodles are thick, and the reconstitution property further improves.

In the case of repeating the moisture supply and the superheated steam treatment in the step (d-2), a method for supplying the moisture to the noodle strings by immersing, showering, or the like while the superheated steam treatment is being stopped or a method for intermittently supplying the moisture to the noodle strings by water shower or the like while the superheated steam treatment is being continuously performed may be selected. Each of these methods can be consecutively carried out in the steps (d-1) and (d-2). In the case of consecutively carrying out each of the methods, the spraying of the superheated steam to the raw noodle strings before the first water shower corresponds to the step (d-1), and the superheated steam treatment after the water shower corresponds to the step (d-2).

In the present invention, when spraying the superheated steam to the raw noodle strings in the step (d-1), the saturated steam may be used at the same time. For example, the superheated steam may be sprayed to the noodle strings in the steam chamber which is filled with the saturated steam. It is preferable that the amount of heat applied to the noodle strings by the superheated steam in the step (d-1) be large. Therefore, it is preferable to spray the superheated steam such that the temperature of the superheated steam to which the noodle strings are exposed becomes 125 to 220° C. If the surfaces of the noodle strings dry while the superheated steam is being sprayed to the raw noodle strings, the subsequent progress of the gelatinization becomes inadequate, and the noodle strings become a burned state. Here, it is preferable that the superheated steam be sprayed such that the noodle string moisture (including the moisture adhered to the surfaces of the noodles by a phenomenon similar to dew condensation) which has increased in amount once by the spraying of the superheated steam does not become equal in amount to or smaller in amount than the moisture of the raw noodle strings (before the superheated steam spraying) by the drying due to the large amount of heat of the superheated steam. A time for spraying the superheated steam depends on the temperature of the steam but is about 5 to 50 seconds, and especially preferably about 15 to 45 seconds.

By producing the instant noodles of the present invention by the above steps, even the thick noodles can be reconstituted by pouring of boiling water. Moreover, even if the thickness of the reconstituted noodle is more than 2 mm, or more than 2.5 mm in some cases, the noodles can be reconstituted, which cannot be realized by conventional instant noodles. In addition, the instant noodles of the present invention have excellent noodle quality. Therefore, the present invention may be especially preferably used for the instant noodles which are eaten by pouring of boiling water.

Advantageous Effects of Invention

In accordance with the present invention, it is possible to obtain the instant noodles which have excellent reconstitution property and can be reconstituted up to their cores by pouring of boiling water even if the noodles are thicker than before. Therefore, he/she can enjoy deep and smooth feeling of instant noodles passing through his/her throat, and conventional instant noodles do not provide such feeling. In addition to the significant improvement of the reconstitution property, the effect of the improvement of the taste and texture, such as wheat flour-like taste, can also be obtained, and the instant noodles can be produced without adversely affecting the noodle making property. Such effect is common to a revolutionary effect observed in the above-described instant noodles which are developed by the present inventors and are produced by using the superheated steam. However, in the present invention, only by forming the noodle strings each having a structure of three or more layers in the technology of using the superheated steam, the effect of the improvement of the reconstitution property significantly increases, which is unpredictable.

When a cross-sectional structure of the product of the present invention produced by the present inventors is actually observed, the three-layer structure apparently has a larger inner space in the noodle string, and the noodle string is being swelled (FIG. 1). When the instant noodle strings obtained by spraying the superheated steam to the raw noodle strings are observed with an electron microscope, layers of broken starch particles are thickly formed on the surfaces of the noodle strings, which is not observed when only the steaming using the saturated steam or only the boiling is performed. Therefore, these layers allow the water to penetrate into the noodle strings. In addition, since the structure of the noodle string includes three or more layers, these may become factors for the significant improvement of the reconstitution property.

DESCRIPTION OF EMBODIMENTS

Figure 1:
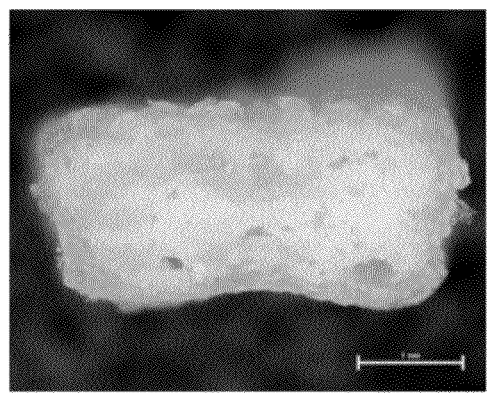
FIG. 1 is a photomacrograph showing a cross section of a noodle string of Example 1 (Product of the present invention; three layers and superheated steam).

Hereinafter, the present invention will be explained in detail in accordance with respective producing steps.

In a noodle making step of obtaining raw noodle strings in a raw noodle making method, the noodle strings are formed to each have a multilayer structure that is equal to or more than at least a three-layer structure including an outer layer, an inner layer, and an outer layer. This multilayer structure is obtained as below. That is, noodle belts as the outer layers and a noodle belt as the inner layer are separately formed. These noodle belts are stacked on one another to form a multilayer noodle belt. This multilayer noodle belt is rolled out and then cut.

Specifically, for each of the noodle belts, main raw material powder and auxiliary raw materials are added to kneading water or are mixed separately from the kneading water. The mixture is adequately kneaded to produce a noodle dough. Examples of the main raw material powder are wheat flour, starch, and buckwheat flour, and examples of the auxiliary raw material are salt, brine water, phosphate, gluten, thickener, and pigment. The produced noodle dough is rolled out to form the noodle belt. Three or more noodle belts produced as above are stacked on each other and are further rolled out to form the noodle belt having the multilayer structure.

The present invention is not limited to the three layers and may be the multilayer structure including four or more layers. In the present invention, an outermost layer exposed to the atmosphere is referred to as the outer layer, and a layer located on an inner side of the outer layer and not exposed to the atmosphere is referred to as the inner layer. In the above case, the number of inner layers may be increased to two, three, etc. The combination of raw materials may be changed among the layers.

The noodle belts as the layers produced as above become one multilayer noodle belt by sandwiching an inner-layer noodle belt between outer-layer noodle belts and stacking these noodle belts on one another by a complex machine or the like. These noodle belts may be stacked such that the thickness of the inner-layer noodle belt is 25 to 85% of the thickness of the combined noodle belt, and preferably 45 to 70%.

This multilayer noodle belt is rolled out by a consecutive rolling machine to have a predetermined thickness. Then, the multilayer noodle belt is cut by a cutting roll into the noodle strings. In the present invention, even if the noodle strings are thicker than before, they can be reconstituted without noodle quality deterioration. In addition, even if the thickness of the reconstituted noodle is more than 2 mm, or more than 2.5 mm in some cases, the noodle strings can be reconstituted. Therefore, the noodle belt which is thicker than before can be cut into the noodle strings.

Fresh multilayer noodle strings produced as above are gelatinized. In the present invention, first, the superheated steam is sprayed to the raw noodle strings. In this step, to apply as large an amount of heat as possible to the surfaces of the noodle strings, it is preferable to spray the superheated steam such that a temperature of the superheated steam which contacts the noodle strings becomes about 125 to 220° C., and preferably about 140 to 180° C. As above, by spraying the high-temperature superheated steam to the noodle strings, the surfaces of the noodle strings get wet once, and the moisture on the surfaces then boils. Such state is specific to the superheated steam, and this may become a factor for the formation of the broken layers of the starch particles on the surfaces of the noodle strings as described above.

The temperature of the superheated steam is equal to or higher than the boiling point. Therefore, if the superheated steam is sprayed to the noodle strings for a long period of time, the noodle strings may dry. If the moisture on the surfaces of the noodle strings evaporates and the noodle strings dry, it becomes difficult to adequately achieve the effects of the present invention. Therefore, the spraying of the superheated steam is terminated such that preferably, the amount of moisture (including the moisture on the surfaces of the noodles due to dew condensation and the like) of the noodle strings does not become smaller than the amount of moisture of the raw noodles. The spraying time varies depending on the flow rate of the superheated steam and the thickness of the noodle string but is about 5 to 50 seconds, and preferably 15 to 45 seconds in a case where the temperature of the superheated steam is about 125 to 220° C. as described above.

The surfaces of the noodle strings are slightly gelatinized by this first spraying of the superheated steam. However, except for extremely thin noodles, this first spraying of the superheated steam is inadequate to gelatinize the noodles to such a degree that the noodles can be eaten. Therefore, the gelatinizing treatment is further performed. Boiling may be used as a method for this further gelatinizing treatment. However, to further improve the reconstitution property or to target thick noodles, it is preferable that the noodles to which the superheated steam has been sprayed be caused to absorb the moisture in liquid form to increase the water content, and the noodles be heated by using the superheated steam or saturated steam.

In the moisture supplying treatment performed here to increase the water content, the noodles to which the superheated steam has been sprayed are supplied with the moisture in liquid form by, for example, water shower or water immersion. Herein, the water may be cold water, hot water, or boiling water. If the water is low in temperature, the temperature of the noodle strings decreases, and the heat efficiency deteriorates. Therefore, the temperature of the water may be set to 40° C. or higher, and especially preferably 50° C. or higher. The moisture may be supplied such that the weight of the noodles before the moisture supply increases about 5 to 30%. A small amount of seasoning, emulsifier, anti-binding agent, and the like may be dissolved in the water.

In the above moisture supplying treatment, the moisture may be supplied to the noodle strings after the noodle strings are taken out once from a steam chamber in which the superheated steam is sprayed to the raw noodle strings or after the spraying of the superheated steam to the raw noodle strings is stopped once. However, in the case of using the superheated steam after the moisture supplying treatment, without stopping spraying the superheated steam to the raw noodle strings in a step (d-1), that is, while continuously spraying the superheated steam to the raw noodle strings in the superheated steam chamber, the moisture may be intermittently supplied to the noodle strings by, for example, water shower in the middle of the spraying. In the case of adopting this method, a step after the moisture supplying treatment corresponds to a step (d-2) of the present invention.

In the gelatinizing treatment performed after the moisture supplying treatment, it is preferable to use the superheated steam again in a case where the noodle strings are thick or in a case where a further higher effect of the improvement of the reconstitution property is desired. However, if the superheated steam is used for a long period of time, the noodle strings gradually dry. If the noodle strings dry out, the effect of the improvement of the reconstitution property does not proceed. Therefore, in the case of using the superheated steam, it is preferable to intermittently supply the moisture in liquid form. That is, when the noodles are thick, it is preferable to spray the superheated steam to the raw noodle strings and then performing water supply and superheated steam spraying alternately plural times.

In this case, the conditions of the superheated steam may be the same as those when the superheated steam is sprayed to the raw noodle strings in the step (d-1) or may be different from those in that the temperature is changed. However, in order to prevent the noodle strings from drying, to be specific, in order to prevent the amount of moisture (including the moisture on the surfaces of the noodles) of the noodle strings during the steaming from becoming smaller than the moisture content of the original raw noodles, the time for steaming once is preferably about 5 to 50 seconds, and further preferably about 15 to 45 seconds, in a case where the temperature of the superheated steam is 125 to 220° C.

When using the superheated steam in the steps (d-1) and (d-2), the saturated steam can also be used at the same time. Specifically, the superheated steam and the saturated steam can be used at the same time by, for example, separately forming a superheated steam emission hole and a saturated steam emission hole in a steam chamber and spraying the superheated steam to the noodle strings through the superheated steam emission hole in the tank which is filled with the saturated steam emitted through the saturated steam emission hole.

Any drying method used to dry normal instant noodles may be used to dry the noodle strings after the gelatinizing treatment. Specifically, fry drying, hot-air drying, microwave drying, freeze dry, and the like may be used alone or in combination. Here, the fry drying is the most advantageous from the viewpoint of the realization of the reconstitution of thick noodle strings. The fry drying is performed at about 130 to 160° C. for about one to three minutes. The hot-air drying is performed at about 60 to 120° C. for about 20 minutes to three hours.

The instant noodles of the present invention produced as above are applicable to a cup noodle which can be eaten just by pouring the boiling water and waiting for about three to five minutes and a package of instant noodles which are boiled and cooked for about one to three minutes. In both cases, the excellent reconstitution property and the excellent noodle quality can be obtained. Although the present invention is applicable to both thick noodles and thin noodles, it is especially effective for the thick noodles. This is because the reconstitution property is extremely good. Thus, he/she can enjoy smooth feeling of noodles passing through his/her throat, and conventional instant noodle products do not provide such feeling.

EXAMPLES

Hereinafter, the present invention will be explained in more details using Examples. However, the present invention is not limited to Examples below.

Experimental Example 1

Experiment Regarding the Difference of Steam Used and the Stack Structure of the Noodle String 430 ml of kneading water in which 20 g of salt and 5 g of phosphate (monophosphate:polymer phosphate=2:3) were dissolved was added to 1 kg of main raw material powder containing 750 g of wheat flour and 250 g of starch. This was adequately kneaded with a mixer to obtain a noodle dough. The obtained noodle dough was shaped to form a noodle belt having a thickness of about 11 mm. This noodle belt was used as the inner-layer noodle belt.

Next, 430 ml of kneading water in which 20 g of salt and 5 g of phosphate (monophosphate:polymer phosphate=3:2) were dissolved was added to 1 kg of main raw material powder containing 750 g of wheat flour and 250 g of starch. This was adequately kneaded with the mixer to obtain a noodle dough. The obtained noodle dough was shaped and rolled out to form an outer-layer noodle belt having a thickness of about 4 mm. Here, two outer-layer noodle belts were formed.

One inner-layer noodle belt having a thickness of 11 mm and two outer-layer noodle belts each having a thickness of 4 mm were stacked in order of the outer layer, the inner layer, and the outer layer while being rolled out. Thus, a three-layer noodle belt having a thickness of about 11 mm was produced as "Sample 1".

Meanwhile, two noodle belts were formed, each of which is formed by the same combination of raw materials as above, is shaped in the same manner as above, and has a thickness of about 11 mm. These two noodle belts were stacked on each other while being rolled out. Thus, a two-layer noodle belt having a thickness of about 11 mm was produced as "Sample 2".

Each of Sample 1 (three-layer) and Sample 2 (two-layer) that were the noodle belts each having a thickness of 11 mm was strongly roiled out once by the rolling machine. Then, each of Samples 1 and 2 was consecutively rolled out three more times to form the noodle belt having a final thickness of 1.8 mm. Each of these noodle belts was cut by using a square blade No. 9 cutting blade roll to obtain raw noodle strings.

While the raw noodle strings made from the noodle belt of each of Samples 1 and 2 were being conveyed by a net conveyor, the superheated steam was sprayed to the noodle strings for 30 seconds in a tunnel-shaped steam chamber. As the conditions of the superheated steam, a steam flow rate was 160 kg/h, and a temperature monitored by a temperature sensor disposed on the surface of the noodle string was about 140° C.

After the superheated steam was sprayed to the noodle strings for 30 seconds as above, the noodle strings were immediately discharged to the outside. Next, the moisture was supplied to the noodle strings by immersing the noodle strings in 2% salt water at about 60° C. for 15 seconds. Then, the noodle strings were again immediately conveyed into the tunnel-shaped steam chamber, and the superheated steam was sprayed to the noodle strings at the steam flow rate of 160 kg/h and the temperature of about 140° C. for 30 seconds in the same manner as above. Further, the noodle strings were discharged to the outside of the steam chamber. The moisture was supplied to the noodle strings by immersing the noodle strings in the 2% salt water at about 60° C. for 15 seconds. Then, the noodle strings were again immediately conveyed into the tunnel-shaped steam chamber, and the superheated steam was sprayed to the noodle strings at the steam flow rate of 160 kg/h and the temperature of about 140° C. for 30 seconds. Thus, the gelatinization was completed.

These noodle strings were immersed in a hot water tank at 90° C. for five seconds and next immersed in a loosening liquid. Then, the noodle strings were cut, and 150 g of the noodles as one meal were filled in a retainer having a capacity of 380 ml. The noodles were fried in palm oil at about 150° C. for two minutes to be dried. The instant fried noodles produced as above were cooled and stored as each of Example 1 (three-layer superheated steam treatment) and Comparative Example 1 (two-layer superheated steam treatment).

Moreover, while the raw noodle strings made from the noodle belt of each of Sample 1 (three-layer) and Sample 2 (two-layer) in the same manner as above were being conveyed by the net conveyor, the gelatinization was performed in the tunnel-shaped steam chamber at 100° C. at the steam flow rate of 240 kg/h for two minutes by using the saturated steam instead of the superheated steam used for Example 1 and Comparative Example 1.

As with Example 1, the noodle strings obtained by the above gelatinization were immersed in the hot water tank at 90° C. for five seconds and next immersed in the loosening liquid. The noodle strings were cut, and 150 g of the noodles as one meal were filled in the retainer having a capacity of 380 ml. The noodles were fried in the palm oil at about 150° C. for two minutes to be dried. The instant fried noodles produced as above were cooled and stored as each of Comparative Example 2 (three-layer saturated steam treatment) and Comparative Example 3 (two-layer saturated steam treatment).

The instant fried noodles of each of Example 1 and Comparative Examples 1, 2, and 3 were put in a styrol cup container. 400 ml of boiling water was poured to each of the containers, and each container was covered with a lid and left for five minutes. The noodles reconstituted by leaving the noodles for five minutes were adequately mixed and eaten by five panelists, and the panelists evaluated the textures of the noodles.

Each of the panelists evaluated the noodles on a scale of one to five, and the average of the scores of the five panelists was rounded off. Thus, evaluations of the noodles were determined. Criteria for evaluation are as follows: "1" denotes that the noodles were hard and not reconstituted; "2" denotes that a part of the noodles were hard and not reconstituted; "3" denotes that the noodles were still hard and not adequately reconstituted; "4" denotes that the noodles were hard but reconstituted; and "5" denotes that the noodles were adequately reconstituted. Table 1 shows the results.

Figure 2:
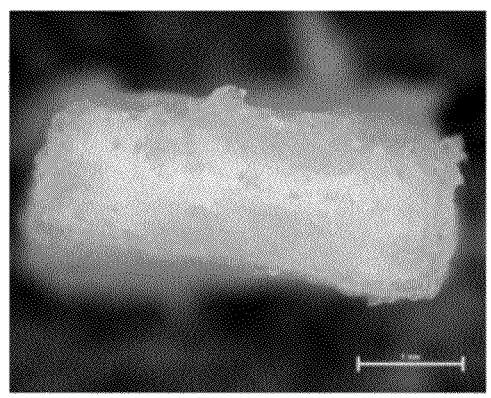
FIG. 2 is a photomacrograph showing a cross section of the noodle string of Comparative Example 1 (two layers and superheated steam).
Figure 3:
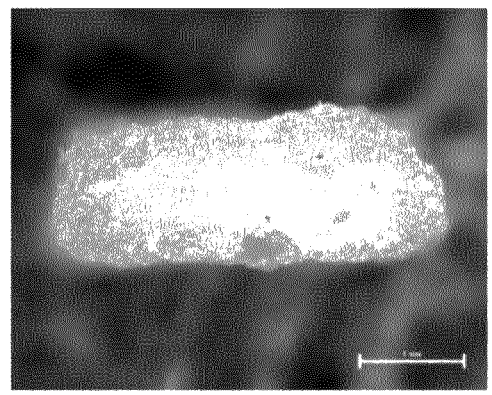
FIG. 3 is a photomacrograph showing a cross section of the noodle string of Comparative Example 2 (three layers and saturated steam).
Figure 4:
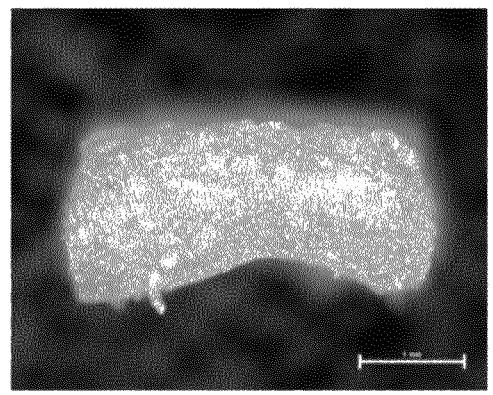
FIG. 4 is a photomacrograph showing a cross section of the noodle string of Comparative Example 3 (two layers and saturated steam).

Each of the noodle strings in a dry state was cut, and cross sections of the noodle strings were observed with an electron microscope. FIGS. 1 to 4 show photographs of those cross sections. As shown by the photographs, the noodle of Example 1 shown in FIG. 1 has the largest inner space, and a largely swelled structure was observed.

TABLE 1

| | Evaluation | Comments |
|---|---|---|
| Example 1 (Three Layers, Superheated Steam) | 5 | The reconstitution property is excellent. A larger amount of water than Comparative Example 1 gets into Example 1. |
| Comparative Example 1 (Two Layers, Superheated Steam) | 4 | The texture is excellent. |
| Comparative Example 2 (Three Layers, Saturated Steam) | 1 | The noodles are hard, and the water does not reach the inner portions of the noodles. |
| Comparative Example 3 (Two Layers, Saturated Steam) | 1 | The noodles are hard, and the water does not reach the inner portions of the noodles. |

Experimental Example 2

Experiment Regarding the Stack Structure of the Noodle String and the Optimal Thickness of the Noodle String Each of Sample 1 (three-layer) and Sample 2 (two-layer) that were the noodle belts formed in the same manner as in Experimental Example 1 and each having a thickness of 11 mm was strongly rolled out once by the rolling machine. Then, each of Samples 1 and 2 was consecutively rolled out three more times. Thus, the noodle belts of various final thicknesses were obtained. Each of these noodle belts was cut by using the square blade No. 9 cutting blade roll to obtain three-layer raw noodle strings or two-layer raw noodle strings.

Moreover, two noodle belts (outer-layer noodle belts) each having a thickness of 6 mm and two noodle belts (inner-layer noodle belts) each having a thickness of 6 mm were formed by using the same combination of raw materials as Samples 1 and 2. First, two inner-layer noodle belts were combined and then sandwiched between the outer-layer noodle belts. Thus, a four-layer noodle belt having a thickness of about 15 mm was produced as "Sample 3" formed by stacking the noodle belts in order of the outer layer, the inner layer, the inner layer, and the outer layer. As with Samples 1 and 2, Sample 3 (four-layer) was strongly rolled out once by the rolling machine and then consecutively rolled out three more times. Thus, the noodle belts of various final thicknesses were obtained. Each of these noodle belts was cut by using the square blade No. 9 cutting blade roll to obtain four-layer raw noodle strings.

The raw noodle strings of various thicknesses obtained by cutting the noodle belts of Samples 1, 2, and 3 were gelatinized by the superheated steam under the same conditions as in Example 1 of Experimental Example 1. Specifically, the superheated steam having a temperature of 140° C. when the superheated steam contacts the surfaces of the noodle strings was sprayed to the raw noodle strings for 30 seconds. Then, the noodle strings were immediately taken out from the steam chamber, and the moisture was supplied to the noodle strings by immersing the noodle strings in the 2% salt water at about 60° C. for 15 seconds. Then, the superheated steam at about 140° C. was again sprayed to the noodle strings for 30 seconds. Further, the noodle strings were taken out from the steam chamber, and the moisture was supplied to the noodle strings by immersing the noodle strings in the same manner as above. Furthermore, the superheated steam at about 140° C. was again sprayed to the noodle strings for 30 seconds. Thus, the gelatinization was performed.

As with Example 1, the noodles were immersed in the hot water tank for five seconds and next immersed in the loosening liquid. Then, the noodle strings were cut, and 150 g of the noodles as one meal were filled in the retainer having a capacity of 380 ml. The noodles were fried in the palm oil at about 150° C. for two minutes to be dried. The instant fried noodles produced as above were cooled and stored as the instant noodles of various thicknesses.

The instant fried noodles were respectively put in the styrol cup containers. 400 ml of boiling water was poured to each of the containers, and each container was covered with a lid and left for five minutes. The thickness (five portions) of the noodle reconstituted by leaving the noodles for exactly five minutes was measured. In addition, the noodles were adequately mixed and eaten by five panelists, and the panelists evaluated the textures of the noodles. Criteria for evaluation are as follows: "Best" denotes that the noodles and their cores were adequately reconstituted and were in good condition (which corresponds to "5" in the evaluation of Experimental Example 1); "Good+" denotes that the noodles and their cores were adequately reconstituted but were reconstituted a bit too much; "Good−" denotes that the cores were slightly hard but were reconstituted; and "NG" denotes that the cores were not reconstituted. Table 2 shows the results.

TABLE 2

|  | Thickness of reconstituted noodle (mm) | | | | |
| --- | --- | --- | --- | --- | --- |
|  | 1.6 | 1.8 | 2.0 | 2.2 | 2.4 |
| Two-layer (Sample 2) | Good+ | Best | Best | Good− | NG |
| Three-layer (Sample 1) | Good+ | Good+ | Best | Best | Good− |
| Four-layer (Sample 3) | Good+ | Good+ | Best | Best | Good− |

In accordance with the results of Table 2, in the case of thick noodle strings, the three-layer noodle strings and the four-layer noodle strings were reconstituted more preferably than the two-layer noodle strings. Even the extremely thick noodles each having a thickness of more than 2 mm were able to be eaten by pouring the boiling water and leaving the noodles for five minutes. There were no big difference between the four-layer noodle strings and the three-layer noodle strings, but a part of the four-layer noodle strings were slightly softer than the three-layer noodle strings.

Experimental Example 3

Experiment Regarding the Number of Superheated Steam Treatments 400 ml of kneading water in which 20 g of salt, 1 g of polymer phosphate, and 3 g of brine water were dissolved was added to 1 kg of main raw material powder containing 850 g of wheat flour and 150 g of starch. This was adequately kneaded with the mixer to obtain a noodle dough. The obtained noodle dough was shaped to form a noodle belt having a thickness of 12 mm. This was used as the inner-layer noodle belt.

Next, 400 ml of kneading water in which 20 g of salt, 1 g of polymer phosphate, and 3 g of brine water were dissolved was added to 1 kg of main raw material powder containing 850 g of wheat flour and 150 g of starch. This was adequately kneaded with the mixer to obtain a noodle dough. The obtained noodle dough was shaped and rolled out to form an outer-layer noodle belt having a thickness of 6 mm. Here, two outer-layer noodle belts were formed.

One inner-layer noodle belt having a thickness of 12 mm and two outer-layer noodle belts each having a thickness of 6 mm were stacked in order of the outer layer, the inner layer, and the outer layer to form a three-layer noodle belt having a thickness of about 15 mm. The noodle belt having a thickness of about 15 mm was strongly rolled out once by the rolling machine and then consecutively rolled out three more times to form the noodle belt having a final thickness of about 1.8 mm. Here, a plurality of noodle belts each having a final thickness of about 1.8 mm were formed. Each of these noodle belts was cut by a square blade No. 16 cutting blade roll to obtain raw noodle strings.

Effects were verified, which were obtained by changing the number of heat treatments with respect to the three-layer raw noodle strings by using the superheated steam. Specifically, first, the noodles (the superheated steam treatment once) were prepared such that the superheated steam having a temperature of about 170° C. when the superheated steam contacts the surfaces of the noodle strings was sprayed to the raw noodle strings for 30 seconds.

Moreover, the noodles (the superheated steam treatment once and the saturated steam treatment once) were prepared such that the superheated steam was sprayed to the raw noodle strings once, the noodle strings were immediately taken out from the steam chamber, the moisture was supplied to the noodle strings by immersing the noodle strings in the 2% salt water at about 60° C. for 15 seconds, and the noodle strings were steamed by using the saturated steam at 100° C. for 30 seconds. Further, the noodles (the superheated steam treatment twice) were prepared such that after the above moisture supply, the superheated steam having a temperature of about 170° C. when the superheated steam contacts the noodle strings was again sprayed to the noodle strings for 30 seconds instead of the saturated steam.

Furthermore, the noodles (the superheated steam treatment three times) were prepared such that after the superheated steam was sprayed to the noodle strings twice, the noodle strings were immediately taken out from the steam chamber, the moisture was supplied to the noodle strings by immersing the noodle strings in the 2% salt water at about 60° C. for 15 seconds, and the superheated steam having a temperature of about 170° C. when the superheated steam contacts the noodle strings was again sprayed to the noodle strings for 30 seconds.

Each of these four types of noodles was immersed in a seasoning liquid to which 3% of salt and a small amount of monosodium glutamate were added. Then, the noodle strings were cut, and 140 g of the noodles as one meal were filled in the retainer having a capacity of 380 ml. The noodles were fried in the palm oil at about 150° C. for two minutes and fifteen seconds to be dried. The instant fried noodles produced as above were cooled and stored as the instant noodles obtained by changing the number of superheated steam treatments. The four types of instant fried noodles were respectively put in styrol cup containers, and 400 ml of boiling water was poured to each of the containers. Each container was covered with a lid and left for exactly four minutes. Then, the thickness (five portions) of the reconstituted noodle was measured. In addition, the four types of noodles each having a thickness of 2 mm were compared to one another. Five panelists ate the noodles and evaluated the textures in accordance with the criteria for evaluation in Experimental Example 1. Table 3 shows the results.

TABLE 3

| Steps | Evaluation | Comments |
|---|---|---|
| Three layers - Superheated steam - Fry | 1 | The noodles were not reconstituted and hard. |
| Three layers - Superheated steam - Water - Saturated steam - Fry | 4 | The noodles were hard but reconstituted. |
| Three layers - Superheated steam - Water - Superheated steam - Fry | 4 | The noodles were hard but reconstituted. |
| Three layers - Superheated steam - Water - Superheated steam - Water - Superheated steam - Fry | 5 | Best condition |

As shown in Table 3, by spraying the superheated steam to the raw noodles, supplying the moisture to the noodle strings, and gelatinizing the noodle strings by using the saturated steam or the superheated steam, even the thick noodle strings each having a thickness of 2 mm when the noodle strings were reconstituted can be reconstituted and eaten by pouring the boiling water and leaving the noodle strings for five minutes.

Example 2

Including the Heating by Using the Saturated Steam 430 ml of kneading water in which 20 g of salt and 5 g of phosphate (monophosphate:polymer phosphate=3:2) were dissolved was added to 1 kg of main raw material powder containing 750 g of wheat flour and 250 g of starch. This was adequately kneaded with the mixer to obtain a noodle dough. The obtained noodle dough was shaped to form a noodle belt having a thickness of about 12 mm. This was used as the inner-layer noodle belt.

Next, 430 ml of kneading water in which 20 g of salt and 5 g of phosphate (monophosphate:polymer phosphate=3:2) were dissolved was added to 1 kg of main raw material powder containing 750 g of wheat flour and 250 g of starch. This was adequately kneaded with the mixer to obtain a noodle dough. The obtained noodle dough was shaped to form a noodle belt having a thickness of about 4.3 mm. Here, two noodle belts were formed and used as the outer-layer noodle belts.

One inner-layer noodle belt having a thickness of 12 mm and two outer-layer noodle belts each having a thickness of 4.3 mm were stacked in order of the outer layer, the inner layer, and the outer layer to form a combined noodle belt having a thickness of about 13.5 mm.

This combined noodle belt was strongly rolled out by the rolling machine and then rolled out four more times. The final thickness of the noodle belt after the rolling was adjusted such that the thickness of the noodle string immediately after the reconstitution becomes 2.0 mm. The noodle belt was cut by the square blade No. 9 cutting blade roll to obtain raw noodle strings.

While the raw noodle strings were being conveyed by the net conveyor, the superheated steam was sprayed to the noodle strings in the tunnel-shaped steam chamber. As the conditions of the superheated steam, the steam flow rate was 160 kg/h, and the temperature monitored by the temperature sensor disposed on the surface of the noodle string was about 140° C. After the superheated steam was sprayed to the noodle strings in the steam chamber for 30 seconds, the noodle strings were immediately discharged to the outside, and the moisture was supplied to the noodle strings by immersing the noodle strings in the 2% salt water at about 60° C. for 10 seconds.

Next, the noodle strings were again immediately conveyed into the tunnel-shaped steam chamber, and the superheated steam was sprayed to the noodle strings at the steam flow rate of 160 kg/h and the temperature of about 140° C. for 30 seconds. Further, the noodle strings were taken out from the steam chamber, and the moisture was supplied to the noodle strings by immersing the noodle strings in a 2% aqueous solution at about 60° C. for 10 seconds. Finally, while the noodle strings were being conveyed again by the net conveyor, the noodle strings were steamed for 30 seconds in the tunnel-shaped steam chamber which was filled with the saturated steam by spraying. As the conditions of the saturated steam, the steam flow rate was 240 kg/h, and the temperature monitored by the temperature sensor disposed on the surface of the noodle string was about 100° C.

The noodles were immersed in the boiling chamber at 90° C. for five seconds and next immersed in the loosening liquid for five seconds. Then, the noodle strings were cut, and 150 g of the noodles as one meal were filled in the retainer having a capacity of 380 ml. The noodles were fried in the palm oil at about 150° C. for two minutes to be dried. Thus, the instant noodles of Example 2 were produced.

The instant noodles were put in the styrol cup container. 400 ml of boiling water was poured to the container, and the container was covered with a lid and left for five minutes. Then, the noodles were adequately mixed and eaten by five expert panelists, and the panelists evaluated the reconstitution property, the texture, and the like. As a result, the noodle strings were adequately reconstituted. Although the noodle strings were thick, i.e., 2 mm in thickness, the noodle strings were adequately reconstituted by pouring the boiling water and leaving the noodle strings for five minutes.

Example 3

Example of Hot-Air Dried Noodles 430 ml of kneading water in which 20 g of salt and 5 g of phosphate (3 g of monophosphate and 2 g of polymer phosphate) were dissolved was added to 1 kg of main raw material powder containing 750 g of wheat flour and 250 g of starch. This was adequately kneaded with the mixer to obtain a noodle dough. The obtained noodle dough was shaped to form a noodle belt having a thickness of about 12 mm.

Next, 430 ml of kneading water in which 20 g of salt and 5 g of phosphate (3 g of monophosphate and 2 g of polymer phosphate) were dissolved was added to 1 kg of main raw material powder containing 750 g of wheat flour and 250 g of starch. This was adequately kneaded with the mixer to obtain a noodle dough. The obtained noodle dough was shaped to form a noodle belt having a thickness of about 4.3 mm.

The former noodle belt having a thickness of about 12 mm was used as the inner-layer noodle belt, and the latter noodle belt having a thickness of about 4.3 mm was used as the outer-layer noodle belt. Three noodle belts were stacked on one another in order of the outer layer, the inner layer, and the outer layer to form a combined noodle belt having a thickness of about 13.5 mm.

This combined noodle belt was strongly rolled out once by the rolling machine. Next, the combined noodle belt was rolled out four more times by the rolling machine. The final thickness of the noodle belt was adjusted such that the thickness of the reconstituted noodle string becomes 1.9 mm. This noodle belt was cut by the square blade No. 9 cutting blade roll to obtain raw noodle strings.

While the raw noodle strings were being conveyed by the net conveyor, the superheated steam was sprayed to the noodle strings in the tunnel-shaped steam chamber. As the conditions of the superheated steam, the steam flow rate was 160 kg/h, and the temperature monitored by the temperature sensor disposed on the surface of the noodle string was about 140° C. After the superheated steam was sprayed to the noodle strings for 30 seconds in the steam chamber, the noodle strings were immediately discharged to the outside, and the moisture was supplied to the noodle strings by immersing the noodle strings in the 2% salt water at about 60° C. for 10 seconds.

Next, the noodle strings were again immediately conveyed into the tunnel-shaped steam chamber, and the superheated steam was sprayed to the noodle strings for 30 seconds at the steam flow rate of 160 kg/h and the temperature of about 140° C. Further, the noodle strings were taken out from the steam chamber, and the moisture was supplied to the noodle strings by immersing the noodle strings in the 2% aqueous solution at about 60° C. for 10 seconds. Then, the noodle strings were again immediately conveyed into the tunnel-shaped steam chamber, and the superheated steam was sprayed to the noodle strings at the steam flow rate of 160 kg/h and the temperature of about 140° C. Thus, the gelatinization was performed.

The noodles were immersed in the hot water tank at 90° C. for 15 seconds and next immersed in the loosening liquid for five seconds. Then, the noodle strings were cut, and 150 g of the noodles as one meal were filled in the retainer having a capacity of 480 ml. The noodle strings were dried by a hot air drier at 100° C. for 30 minutes with a wind speed of 3 m/min. Hot-air dried noodles produced as above were cooled and stored as the instant noodles of Example 3.

The instant noodles were put in the styrol cup container. 400 ml of boiling water was poured to the container, and the container was covered with a lid and left for five minutes. Then, the noodles were adequately mixed and eaten by five expert panelists, and the panelists evaluated the reconstitution property, the texture, and the like. As a result, the noodles were adequately reconstituted. It was clear that the effect of the improvement of the reconstitution property of the hot-air dried noodles is obtained.

Example 4

Using Both the Superheated Steam and the Saturated Steam 430 ml of kneading water in which 20 g of salt and 5 g of phosphate (monophosphate:polymer phosphate=3:2) were dissolved was added to 1 kg of main raw material powder containing 750 g of wheat flour and 250 g of starch. This was adequately kneaded with the mixer to obtain a noodle dough. The obtained noodle dough was shaped to form a noodle belt having a thickness of about 6 mm. Here, two noodle belts were formed and used as the inner-layer noodle belts.

Next, 430 ml of kneading water in which 20 g of salt and 5 g of phosphate (monophosphate:polymer phosphate=3:2) were dissolved was added to 1 kg of main raw material powder containing 750 g of wheat flour and 250 g of starch. This was adequately kneaded with the mixer to obtain a noodle dough. The obtained noodle dough was shaped to form a noodle belt having a thickness of about 6 mm. Here, two noodle belts were formed and used as the outer-layer noodle belts.

First, two inner-layer noodle belts were combined and then sandwiched between the outer-layer noodle belts. Thus, a four-layer combined noodle belt having a thickness of about 15 mm was produced by stacking the noodle belts in order of the outer layer, the inner layer, the inner layer, and the outer layer.

This combined noodle belt was strongly rolled out by the rolling machine and then consecutively rolled out four more times. The final thickness of the noodle belt after the rolling was adjusted such that the thickness of the noodle string immediately after the reconstitution becomes 2.0 mm. This noodle belt was cut by the square blade No. 9 cutting blade roll to obtain raw noodle strings.

While the raw noodle strings were being conveyed by the net conveyor, the superheated steam was sprayed to the noodle strings in the tunnel-shaped steam chamber which was filled with the saturated steam by spraying. The steam flow rate of the total of the superheated steam and the saturated steam was 160 kg/h, and the temperature monitored by the temperature sensor disposed on the surface of the noodle string was about 140° C. After the superheated steam was sprayed to the noodle strings for 30 seconds in the steam chamber which was filled with the saturated steam, the noodle strings were immediately discharged to the outside, and the moisture was supplied to the noodle strings by immersing the noodle strings in the 2% salt water at about 60° C. for 10 seconds.

Next, the noodle strings were again immediately conveyed into the tunnel-shaped steam chamber, and the superheated steam was sprayed to the noodle strings at the steam flow rate of 160 kg/h and the temperature of about 140° C. for 30 seconds without supplying the saturated steam to the tank. Further, the noodle strings were taken out from the steam chamber, and the moisture was supplied to the noodle strings by immersing the noodle strings in the 2% aqueous solution at about 60° C. for 10 seconds. Finally, while the noodle strings were again being conveyed by the net conveyor, the noodle strings were steamed only by the saturated steam for 30 seconds in the tunnel-shaped steam chamber which was filled with the saturated steam by spraying. As the conditions of the saturated steam, the steam flow rate was 240 kg/h, and the temperature monitored by the temperature sensor disposed on the surface of the noodle string was about 100° C.

The noodles were immersed in the boiling chamber at 90° C. for five seconds and next immersed in the loosening liquid for five seconds. The noodle strings were cut, and 150 g of the noodles as one meal were filled in the retainer having a capacity of 380 ml. The noodles were fried in the palm oil at about 150° C. for two minutes to be dried. Thus, the instant noodles of Example 4 were produced.

The instant noodles were put in the styrol cup container. 400 ml of boiling water was poured to the container, and the container was covered with a lid and left for five minutes. Then, the noodles were adequately mixed and eaten by five expert panelists, and the panelists evaluated the reconstitution property, the texture, and the like. As a result, the noodle string was adequately reconstituted. Although the noodles were thick, that is, 2 mm in thickness, the noodles were adequately reconstituted by pouring the boiling water and leaving the noodles for five minutes.

The invention claimed is:
1. A method for producing instant noodles, comprising:
    making raw noodle strings each having a multilayer structure including three or more layers;
    spraying superheated steam having a temperature of 125° C. or higher to the raw noodle strings;

gelatinizing the noodle strings to which the superheated steam has been sprayed; and drying the noodle strings which have been gelatinized, wherein the gelatinizing includes a treatment in which moisture in liquid form is supplied to the noodle strings to which the superheated steam has been sprayed, and the noodle strings are further heated by using superheated steam and/or saturated steam.

2. A method for producing instant noodles, comprising:

adding kneading water to noodle raw material powder, kneading this mixture to prepare a noodle dough, and rolling out the noodle dough to form a noodle belt;

stacking and rolling out three or more noodle belts, each formed by the adding, the kneading and the rolling out the noodle dough, to combine these noodle belts into one noodle belt having a multilayer structure;

further rolling out the combined noodle belt of the multilayer structure and cutting the combined noodle belt to obtain raw noodle strings;

spraying superheated steam having a temperature of 125° C. or higher to the raw noodle strings;

gelatinizing the noodle strings to which the superheated steam has been sprayed; and drying the noodle strings which have been gelatinized, wherein the gelatinizing includes a treatment in which moisture in liquid form is supplied to the noodle strings, to which the superheated steam has been sprayed, to increase a water content of the noodle strings, and the noodle strings are further heated by using superheated steam and/or saturated steam.

3. The method according to claim 2, wherein in the gelatinizing, the treatment in which the moisture in liquid form is supplied to the noodle strings to increase the water content of the noodle strings and the noodle strings are further heated by using the superheated steam and/or the saturated steam is carried out twice or more.

4. The method according to claim 2, wherein the spraying of the superheated steam is performed in a saturated steam atmosphere.

5. The method according to claim 2, wherein in the spraying of the superheated steam, a temperature of the superheated steam to which surfaces of the noodle strings are exposed is 125 to 220° C., and a time for spraying the superheated steam to the noodle strings is 5 to 50 seconds.

6. The method according to claim 1, wherein in the spraying of the superheated steam, a temperature of the superheated steam to which surfaces of the noodle strings are exposed is 220° C. or lower.

7. The method according to claim 2, wherein in the spraying of the superheated steam, a temperature of the superheated steam to which surfaces of the noodle strings are exposed is 220° C. or lower.

8. The method according to claim 1, wherein in the spraying of the superheated steam, a temperature of the superheated steam to which surfaces of the noodle strings are exposed is 125° C. to 220° C.

9. The method according to claim 2, wherein in the spraying of the superheated steam, a temperature of the superheated steam to which surfaces of the noodle strings are exposed is 125° C. to 220° C.

* * * * *